United States Patent
Bouw et al.

(10) Patent No.: US 8,572,157 B2
(45) Date of Patent: Oct. 29, 2013

(54) CONFIGURATION BASED APPROACH TO UNIFY WEB SERVICES

(75) Inventors: Rene J. Bouw, Kirkland, WA (US); Christian Liensberger, Bellevue, WA (US); Murat Soyupak, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 173 days.

(21) Appl. No.: 13/017,491

(22) Filed: Jan. 31, 2011

(65) Prior Publication Data

US 2012/0197963 A1   Aug. 2, 2012

(51) Int. Cl.
 G06F 15/16 (2006.01)
(52) U.S. Cl.
 USPC ........... 709/202; 709/232; 707/741; 707/769; 707/803
(58) Field of Classification Search
 USPC .................. 709/202, 232; 707/741, 769, 803
 See application file for complete search history.

(56) References Cited

U.S. PATENT DOCUMENTS

| | | | |
|---|---|---|---|
| 6,356,920 B1 | 3/2002 | Vandersluis | |
| 6,366,934 B1 | 4/2002 | Cheng et al. | |
| 6,480,860 B1 | 11/2002 | Monday | |
| 6,484,160 B1 | 11/2002 | Richard et al. | |
| 6,591,260 B1 | 7/2003 | Schwarzhoff et al. | |
| 6,604,100 B1 | 8/2003 | Fernandez et al. | |
| 6,708,164 B1 | 3/2004 | Cseri | |
| 7,213,017 B2 | 5/2007 | Rys | |
| 7,444,321 B2 | 10/2008 | Cseri | |
| 7,702,724 B1 | 4/2010 | Brydon | |
| 2002/0069366 A1* | 6/2002 | Schoettger | 713/201 |
| 2007/0022103 A1* | 1/2007 | Rys et al. | 707/3 |
| 2007/0169199 A1 | 7/2007 | Quinnell et al. | |
| 2008/0082689 A1* | 4/2008 | Saad | 709/246 |
| 2011/0078553 A1* | 3/2011 | Reimann et al. | 715/234 |

OTHER PUBLICATIONS

Chadwick, "Using jQuery with OData and WCF Data Services," Published Aug. 2, 2010, http://www.windowsitpro.com/article/net-framework/Using-jQuery-with-OData-and-WCF-Data-Services.aspx.

Mulligan et al., "A comparison of SOAP and REST implementations of a service based interaction independence middleware framework," Proceedings of the 2009 Winter Simulation Conference, 2009.

Announcing the OData SDK, Retrieved Nov. 10, 2010, http://blogs.msdn.com/b/astoriateam/default.aspx?p=8/default.aspx&PostSortBy=MostViewed&PageIndex=1.

(Continued)

Primary Examiner — Wing F Chan
Assistant Examiner — Hitesh Patel
(74) Attorney, Agent, or Firm — Workman Nydegger

(57) ABSTRACT

Brokering requests between a user and a content provider. Methods include receiving, at the middleware system, a request for data from a user that is formatted in a first request format and requests data from a content provider. The request is translated to a second request format that is compatible with the content provider and sent to the content provider. A response is received from the content provider that includes hierarchically-structured content. The hierarchically-structured content is converted into tabular content by performing first queries on the hierarchically-structured content to identify repeating nodes, and mapping the repeating nodes to rows in the tabular format, and by performing second queries on the hierarchically-structured content to identify individual columns in the tabular format.

19 Claims, 2 Drawing Sheets

(56) References Cited

OTHER PUBLICATIONS

Katayama, "TogoWS: integrated SOAP and REST APIs for interoperable bioinformatics Web services," Published Apr. 28, 2010, http://nar.oxfordjournals.org/content/38/suppl_2/W706.full.

Virtuoso Open Source Edition News, Retrieved Nov. 10, 2010, http://ods.openlinksw.com/wiki/main/Main/VOSNews.

Frequently Asked Questions, Windows Azure Platform, Retrieved Nov. 10, 2010, http://msdn.microsoft.com/en-us/library/ff717669.aspx.

W3C ("Namespaces in XML" World Wide Web Consortium Jan. 14, 1999).

XML-QL: A Query Language for XML, http://www.w3.org/TR/1998/NOTE-xml-gl-19980819/, Submission to the World Wide Web Consortium, 1-19, (Aug. 19, 1998).

P. Wadler, "XML", http://www.cs.bell-labs.com/who/wadler/topics/xml.html. A Data Model and Algebra for XML Query, 1-3, (Nov. 1999).

Oracle8 Concepts, Release 8.0, Dec. 1997.

Abiteboul, S., et al., "The Lorel Query Language for Semistructured Data", International Journal of Digital Libraries, Nov. 1996, Published 1997, 1(1), 68-88.

Deutsch, A., et al., "Storing Semistructured Data with STORED", SIGMOD, Jun. 1999, 431-442.

Shanmugasundaram, J., et al., "Relational Databases for Querying XML Documents: Limitations and Opportunities", VLDB, Sep. 1999, 302-314.

Desousa, A., et al. "Mapping Rules to Convert from ODL to XML-SCHEMA", Proceedings 22nd International Conference of the Chilean Computer Science Society, Nov. 2002, 133-141.

Deutsch, A., "A Query Language for XML", Computer Networks, May 1999, 31(11-16), 1155-1169.

Du, W., "XML Structures for Relational Data", Proceedings of the Second International Conference on Web Information Systems Engineering, Jan. 2002, 1, 151-160.

Feng, D., "Research and Implementation of Mapping Relational Database to Extensible Markup Language Document", Journal of Xi'an Jiaotong University, Oct. 2002, 36(10), 1066-1069, 1074.

Jacinto, M.H. et al., "BiDirectional Conversion between XML Documents and Relational Databases", 7th International Conference on Computer Supported Cooperative Work in Design, Sep. 2002, 437-443.

Lee, D. et al., "Constraints-Preserving Inlining Algorithm for Mapping XML DTD to Relational Schema", Data & Knowledge Engineering, Jul. 2001, 39(1), 3-25.

Rys, M. "Bringing the Internet to you Database: Using SQl server 2000 and XML to Build Loosely-Coupled Systems", Conference Proceedings, Vision for a New Millennium, Apr. 2001, 109-122.

Shanmugasundaram, J., et al., "A General Technique for Querying XML Documents Using a Relational Database System", SIGMOD Record, Sep. 2001, 30(3), 20-26.

Wenwu, L. et al., "Lossless Mapping from Semi-Structured Data to Structured Data", Journal of Southeast university (English Edition), Mar. 2002, 18(1), 46-53.

U.S. Appl. No. 11/536,003, Sep. 23, 2008, Office Action.
U.S. Appl. No. 11/536,003, Apr. 1, 2009, Office Action.
U.S. Appl. No. 11/536,003, Oct. 5, 2009, Office Action.
U.S. Appl. No. 11/536,003, Feb. 18, 2010, Notice of Allowance.

* cited by examiner

CONFIGURATION BASED APPROACH TO UNIFY WEB SERVICES

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive various forms of data from other computing systems.

For example, many computing systems are configured as content provider computing systems that provide data sets and other information to users, such as client computing systems, in response to data requests from the users. Content providers may use a variety of open or proprietary data and messaging formats to receive and respond to data requests from users. For example, content providers might use combinations of the HyperText Markup Language (HTML), the eXtensible Markup Language (XML), the Simple Object Access Protocol (SOAP) the Web Service Definition Language (WSDL), the Atom Syndication Format (ATOM), the JavaScript Object Notation (JSON), etc. Generally, content providers provide custom Application Programming Interfaces (APIs), which allow users to send requests and receive responses.

The flexibility and choice of data and messaging formats available to content providers for implementing custom APIs can complicate user consumption of the data sets and other information the content providers make available through their custom APIs. To request data from a given content provider, users may need to consult that provider's custom API to determine how to send data requests to that content provider, and then determine how to process responses received from that content provider. Further, users may need to perform additional processing on responses to determine whether error conditions exist in connection with the response, and to convert the response into a consumable format. Users may need to repeat this process for each content provider from which the users request data, which can become a time-consuming and complicated task.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method practiced in a computing environment including at least a middleware system, a user, and a content provider. The method includes various acts for brokering requests between the user and the content provider. The method includes receiving, at the middleware system, a request for data from a user. The request is formatted in a first request format and requests data from a content provider. The method further includes translating the request to a second request format that is compatible with the content provider, and sending the translated request to the content provider. As a result of sending the translated request to the content provider, a response is received from the content provider that includes hierarchically-structured content. The hierarchically-structured content is converted into tabular content by performing first queries on the hierarchically-structured content to identify repeating nodes, and mapping the repeating nodes to rows in the tabular format, and by performing second queries on the hierarchically-structured content to identify individual columns in the tabular format.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments of the present invention may comprise or utilize a special purpose or general-purpose computer including computer hardware, as discussed in greater detail below.

Some embodiments described herein may include a middleware system that provides information and data brokerage between users and content providers, and that provides uniform APIs to users, enabling users to request data sets and other information from content providers via the middleware system.

Figure 1:
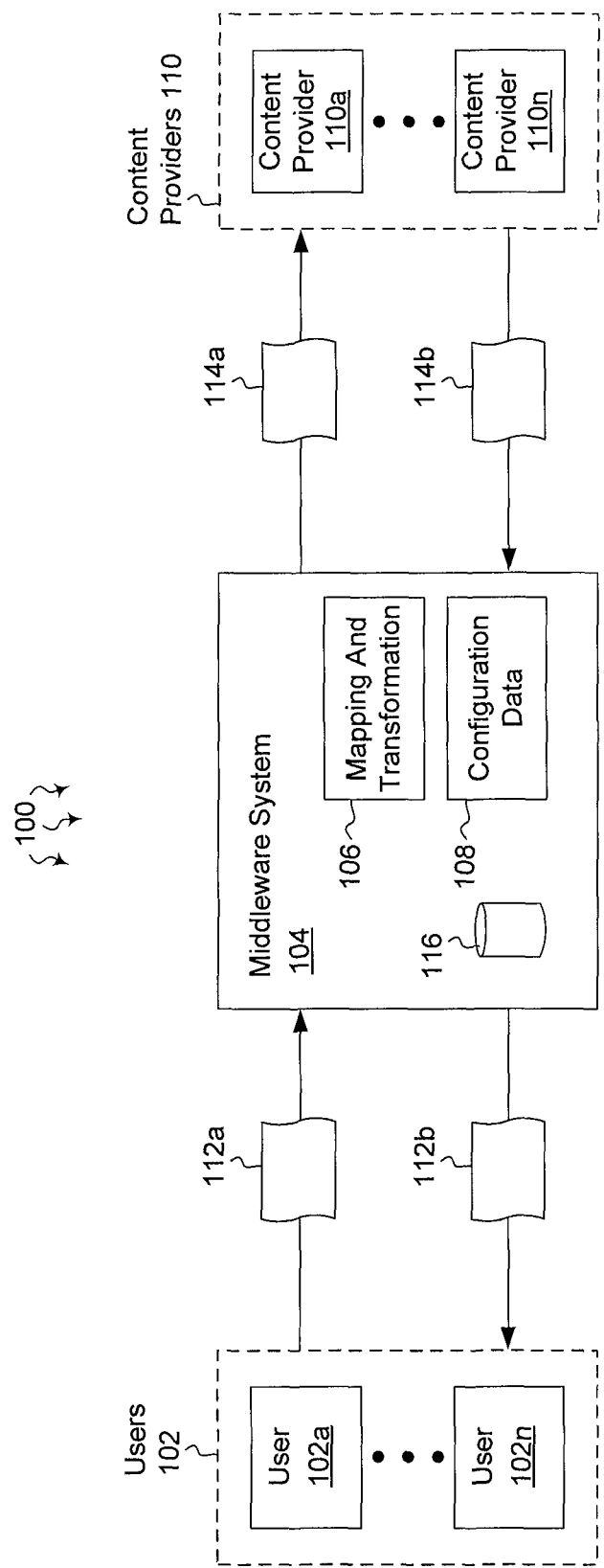
FIG. 1 illustrates an information and data brokerage environment.

Referring now to FIG. 1 an exemplary information and data brokerage environment 100 is illustrated. FIG. 1 illustrates a middleware system 104 that brokers messages, such as data requests and responses, between users 102 and content providers 110. Middleware system 104 can broker messages between any number of users and any number content providers, as indicated by the vertical ellipses illustrated in connection with users 102 and content providers 110.

Users 102 and middleware system 104 can communicate via any appropriate communications mechanism. In one embodiment, users 102 can be locally connected to middleware system 104, while in other embodiments users 102 can be remotely connected to middleware system 104 via a network connection, such as wired or wireless Ethernet, the Internet, cellular connections, or even computer to computer connections through serial, parallel, USB, or other connections. Similarly, middleware system 104 and content providers 110 can also communicate via any communications mechanism, local or remote, as described above.

Users 102 and middleware system 104 communicate using uniform data and messaging formats. Uniform data and messaging formats, as used herein means a communications protocol that is the same or similar for a given group of entities. In particular, the examples illustrated herein show a uniform protocol for all users 102. For example users 102 and middleware system 104 can communicate with uniform messages 112*a* and 112*b*, which may be formatted according to a uniform data and messaging format. In some instances, uniform message 112*a* might comprise a uniform data request, while uniform message 112*b* might comprise a uniform response. In some embodiments, middleware system 104 might implement REST-based APIs and use Open Data Protocol (OData)-based messages with a tabular (i.e. rows and columns) data format.

Middleware system 104 and content providers 110 may communicate using custom data and messaging formats. Custom data and messaging formats as used herein means different communications protocols for different entities. For example custom messages 114*a* and 114*b* might be formatted according to custom data and messaging formats. For example, some content providers may communicate using a first custom protocol, while other content providers communicate using a second custom protocol. Custom does not necessarily mean proprietary to a particular entity, as a custom protocol may in fact be a standardized protocol. In some instances, custom message 114*a* may comprise a custom data request, while custom message 114*b* may comprise a custom response.

Content providers 110 may each implement custom APIs that define corresponding custom data and messaging formats. Absent middleware system 104, these custom APIs can complicate access by users 102 to data sets and other information provided by content providers 110. For example, content provider 110*a* might implement a custom SOAP-based API with corresponding custom data and messaging formats, while content provider 110*n* might implement a different custom WSDL-based API with corresponding custom data and messaging formats. Users requesting data directly from either of content provider 110*a* or 110*n* may need to learn that content provider's custom API, and then communicate directly with that content provider using the content provider's custom data and messaging formats. Furthermore, users requesting data directly from both of providers 110*a* and 110*n* might need to learn custom APIs for both of providers 110*a* and 110*n*.

Middleware system 104 provides uniform APIs usable by any number of users 102 to make data requests of any number of content providers 110. The uniform APIs define uniform data and messaging formats that enable users 102 to make uniform data requests to content providers 110 via middleware system 104, and to receive uniform responses. Thus, users 102 can use the uniform APIs of middleware system 104 to request and receive data sets and other information from any content provider for which middleware system 104 provides information and data brokerage.

In response to receiving a uniform data request from a user, middleware system 104 can convert the uniform data request to a custom data request that requests data sets and other information from a specific content provider according to that content provider's custom APIs. Middleware system 104 can then send the custom data request to the specific content provider on behalf of the user. In some circumstances, a single uniform data request might be converted to multiple custom data requests. Continuing the above example, middleware system 104 might receive uniform data request 112*a* from user 102*a* requesting data sets and other information from content provider 110*a* (which implements a custom SOAP-based API). Middleware system 104 can convert uniform data request 112*a* into custom SOAP-based data request 114*a* that requests data from content provider 110*a* and forward custom SOAP-based data request 114*a* to content provider 110*a*. Content provider 110*a* can then reply with custom SOAP-based response 114*b*.

After receiving a custom response from a content provider, middleware system 104 can convert the custom response to a uniform data format that can be stored by middleware system 104 and/or returned to a user. For example, middleware system can include storage 116 for storing uniform data. Additionally or alternatively, middleware system 104 can send a uniform response to the requesting user containing all or part of the uniform data. In some circumstances, uniform data from multiple custom messages can be included in a single uniform response. Still continuing the above example, middleware system 104 can convert all or part of custom SOAP-based response 114*b* to a uniform data format. Middleware system 104 can store the uniform data at storage 116. Additionally or alternatively, middleware system 104 can send uniform response 112*b* to user 102*a*. Uniform response 112*b* can include all or part of custom SOAP-based response 114*b*, converted to uniform data.

Notably, a single custom response may include data sets and other information from multiple sources, such as data from multiple custom responses from a single content provider, or data from multiple content providers. Furthermore it is noted that, while embodiments are described in the context of a request/response framework in which custom response messages are received in response to uniform data requests, the invention is not so limited and can be practiced in any appropriate communication context. For example, the invention can also be practiced within a subscription context such that once a subscription is initially configured a response message 114*b* can be received by middleware system 104 from a content provider 110 without a user 102 first sending a uniform data request 112*a* to the content provider 110. Furthermore, the invention can also be practiced in an asynchronous communication context, in which there may not be a direct correlation between requests and responses. Thus, the invention can be practiced in any situation in which users 102 send messages to content providers 110, and/or in which content providers 110 send responses to users 102, regardless of the particular message flow.

In some embodiments, middleware system 104 may include a mapping and transformation component 106 and configuration data 108. Mapping and transformation component 106 can be used by middleware system 104 to transform uniform requests from users 102 to custom requests that can be sent to content providers 110. Mapping and transformation component 106 can also be used by middleware system to map custom responses and data received from content providers 110 to uniform data formats and responses that can be stored and/or sent to users 102.

In some embodiments, the middleware system 104 implements a runtime module that accesses configuration data 108 to provide information and data brokerage. For example, mapping and transformation component 106 can comprise a runtime module configured by configuration data 108. In other embodiments, middleware system 104 can generate code from configuration data 108. For example, mapping and transformation component 106 can comprise generated code that is generated, at least in part, based on configuration data 108. Of course, middleware system 104 can also comprise custom code, or can comprise any combination of a runtime module, generated code, and/or custom code.

Referring to configuration data 108, middleware system 104 can include configuration data for each content provider 110. Configuration data 108 can define, among other things, provider information that is used to transform uniform messages to custom messages for a given content provider, and mapping information that is used to map custom messages from a given provider to uniform data and messaging formats. Configuration data 108 can also include other information, such as parameter definition and validation information, custom namespace information, error checking information, paging information, and the like. Configuration data 108 may be formatted in any suitable format, such as for example an XML format. In one embodiment, configuration data 108 may be formatted in accordance with the Conceptual Schema Definition Language (CSDL).

Provider information defines basic information for communicating with each content provider 110, including information defining how use data from a uniform data request to create a custom data request using a particular content provider's custom API. The provider information can define, among other things, a base Uniform Resource Identifier (URI) that identifies how and/or where to access the particular content provider, and a request body that defines the format and structure of a custom message for that provider. An exemplary base URI definition might define a URI path to the content provider and possibly parameters. Parameters might take the form of name/value pairs comprising statically-defined values, or placeholders for user-supplied values (provided in the user's request). For instance, for a given provider method, configuration data 108 can include a "FunctionImport" XML node that identifies the provider method and includes a reference to the base URI for the method. One non-limiting example might be:

```
<FunctionImport
    Name="MyWebServiceMethod"
    EntitySet="MyEntities"
    ReturnType="Collection(MyServie.MyEntityType)"
    BaseUri="http://services.organization.net/MyServicePath?name=
    {name}" >
```

Further, when a content provider's custom API permits or requires custom messages to include a message body, the provider information can define the format and structure of the message body. For example, a message body might comprise SOAP-formatted information comprising hierarchically-structured nodes having elements and/or attributes that include statically-defined values and/or placeholders for user-supplied values. One non-limiting example of a message body might be:

```
<RequestBody httpMethod="POST">
    <![CDATA[soapenv:Envelope xmlns:soapenv="..." xmlns:MyService="
    http://services.organization.net/MyServicePath"
        <soapenv:Header />
        <soapenv:Body>
            <MyService:ws_MyWebServiceMethod>
                <myWebServiceMethodRequest>
                    <UserId>userid</UserId>
                    <Password>password</Password>
                    <Name>{name}</Name>
                </ myWebServiceMethodRequest>
            </MyService:ws_MyWebServiceMethod>
        </soapenv:Body>
    </soapenv:Envelope>
]]>
</RequestBody>
```

Uniform data requests can include user-supplied parameters and corresponding values. In one embodiment, a placeholder for a user-supplied value might be denoted in the provider information by curly braces that surround a parameter name. For example, when defining a value for a name/value pair, a placeholder for a value for the parameter "Name" may take the form '{name}' as shown in the foregoing base URI and message body examples.

Parameter definition information can provide users 102 with detailed information about available parameters for a particular content provider. For example, a parameter definition can include: the name of the parameter; a type that specifies the type of the parameter, such as string, Boolean, double, float, binary, etc.; an indication of whether or not the parameter is required; validation information that that specifies valid values of the parameter; a description that provides help information for the parameter; sample values; an enumeration of possible values, and the like. Parameter definition information can be published to users 102 through the uniform API.

In one embodiment, parameter definition information can be defined within a "Parameter" XML node that includes parameter definition information defined by attributes of the XML tag. For example, one "Parameter" XML node might include elements or attributes such as: Name="username", Type="String", Nullable="false" (indicating the parameter is not required), Regex="^[a-zA-Z]*$" (a regular expression for parameter value validation), Description="A human-readable description of the parameter" or SampleValues="George|John|Thomas|James".

Validation information for a parameter can be used by middleware system 104 to verify that a user-supplied parameter is valid prior to sending a custom message to a content provider. Validation information might comprise regular expressions, ranges of values, enums, and the like. For example, if a uniform data request includes an invalid parameter, middleware system 104 may return an error to the requesting user and cease further processing of the request. A parameter might be invalid if it fails to match a regular expression, if it is outside a range of values, or if it does not appear in an enum.

Mapping information can define how to map custom responses from content providers 110 to uniform data and messaging formats that can be stored in storage 116 and/or sent to users 102. In some embodiments, when content providers 110 respond to custom requests, the custom responses include hierarchically-structured response data (e.g., XML-formatted data such as SOAP or WSDL). When mapping hierarchically-structured response data to uniformly-formatted data, middleware system 104 may map the hierarchically-structured data to tabular data (i.e. rows and columns). Mapping hierarchically-structured response data to tabular data enables tabular functions such as joins, queries, and projections. These tabular functions can be used, among other things, to present a plurality of data sets to users 102 as a unified data set.

In one embodiment, mapping information might define a series of queries for mapping hierarchically-structured data to tabular data. For example, configuration data 108 can provide mapping and transformation component 106 with a series of queries to execute on the hierarchically-structured data, and direct mapping and transformation component 106 how to use the results of those queries to map the hierarchically-structured data to tabular data. To illustrate, mapping information can define first queries that, when executed on the hierarchically-structured data, identify repeating nodes in the hierarchically-structured data. Each repeating node can be mapped to a row in the tabular format. Mapping information can also define second queries that, when executed on the hierarchically-structured data, identify elements and/or attributes in the repeating nodes. Each element and/or attribute can be mapped to a column corresponding to a row in the tabular format. The second queries can include absolute queries and/or relative queries. An absolute query returns data that is valid for all of the repeating nodes, while a relative query returns data that is specific to a given repeating node. In one embodiment, the queries may be defined according to the XML Path Language (XPath) query language.

For instance, middleware system 104 might receive a custom response from content provider 110a, such as custom SOAP-based response 114b. Mapping information for content provider 110a may define a plurality of XPath queries for extracting rows and columns from custom SOAP-based messages from content provider 110a. First XPath queries can determine repeating XML nodes in a custom SOAP-based response 114b, while second XPath queries can determine elements and/or attributes of the repeating XML nodes. Results from the first XPath queries can be used to define and populate tabular rows, while results from the second XPath queries can be used to define and populate tabular columns. The second XPath queries may be relative, executed on each repeating node to return elements and/or attributes for that specific node, or the second XPath queries may be absolute, returning elements and/or attributes that apply to all the repeating XML nodes. Of course, the embodiments are not limited to converting SOAP-based messages to tabular formats.

In one embodiment, XPath queries might be defined within an "EntityType" XML node in configuration data 108. One non-limiting example might include:

```
<EntityType Name="MyEntityType" ... Map="/MyResponse/MyEntities">
    <Property Name="Amount" ... Map="./Remaining[@Amount]" />
    <Property Name="City" ... Map="./City" />
    <Property Name="State" ... Map="./State" />
    <Property Name="Zip" ... Map="./Zip" />
</EntityType>
```

In this example, the)(Path query, "/MyResponse/MyEntities" might identify a plurality of repeating "MyEntities" nodes in the response, which are then mapped to tabular rows. Each "Property" XML node can then identify elements or attributes of each repeating "MyEntities" node via secondary XPath queries and map any corresponding values to tabular columns (e.g. Amount, City, State, and Zip columns). In this example, each secondary XPath query is a relative XPath query (relative to a given "MyEntities" repeating node), as denoted by the dot (".") operator.

Custom SOAP-based response 114b might, in one embodiment, represent a hierarchically-structured weather forecast for a given day. In this example, the hierarchically-structured data may include a plurality of repeating "forecast" nodes that represent different weather forecasts for each hour of the given day. Furthermore, each repeating "forecast" node might include one or more elements and/or attributes defining a specific weather forecast, such as temperature, precipitation, barometric pressure, etc. Each repeating "forecast" node might also include or be associated with information valid for all repeating "forecast" nodes, such as a forecast date or a copyright statement. To convert the hierarchically-structured weather forecast data to tabular data, the first set of queries may return each of the repeating "forecast" nodes, and map these nodes to tabular rows. Then, the second set of queries may return elements and/or attributes of the repeating "forecast" nodes, and map these elements and/or attributes to tabular columns. When performing the second set of queries, a relative query may be performed relative to each "forecast" node to determine temperature, precipitation, barometric pressure, etc. for that node; whereas an absolute query may be performed to determine a forecast date or copyright information for all the repeating "forecast" nodes.

Configuration data 108 may include other information such as custom namespace identifiers that identify namespaces to be used in XPath queries. In some instances, namespaces of custom messages could be different from the namespace of configuration data 108. Configuration data may define custom namespace identifiers for use within these XPath queries. In one example, a custom namespace might be defined within a "Namespace" XML node in which a "Prefix" element or attribute defines an abbreviation for the namespace, and a "Uri" attribute defines a URI to the namespace definition. In one non-limiting example, a custom namespace identifier might be:

<Namespace Prefix="p" Uri="http://schemas.organization.net/Foo"/>

In this example, the prefix "p" can be used in connection with an XPath query to denote that the XPath query is to be performed within the "http://schemas.organization.net/Foo" namespace.

Configuration data 108 may also include error handling information that may be used by middleware system 104 to verify whether custom messages from content providers 110 indicate error conditions. Error handling information can include mappings that map error conditions to error codes and/or error messages. In some embodiments, when an error occurs while content providers 110 are processing custom requests, custom response messages indicate the error condition through a status code for the message itself (e.g., with an HTTP status code). In this situation, middleware system 104 might take some remedial action, such as sending a notification to the requesting user that the error condition has occurred and/or ceasing further processing of the custom message. However, in other embodiments, content providers 110 might provide custom response messages with status codes for the message itself indicating success (e.g. with an HTTP status code), but also includes an indication of the error condition within a body of the custom message. In these situations, middleware system 104 may detect the error condition by parsing the body of the custom message for an indication of the error condition prior to converting the custom message to a uniform data and messaging format. If an error condition is detected, middleware system 104 may use the error handling information to map the detected error condition to a status code (such as an HTTP status code) and/or an error message, and then take some remedial action, such as sending a notification to the requesting user that the error has occurred and/or ceasing further processing of the custom message. In some cases, the middleware system may parse the body of custom messages for error conditions using XPath queries.

Configuration data 108 may also include paging information that maps uniform paging used by middleware system 104 to custom paging used by content providers 110 and vice-versa. Middleware system 104 and content providers 110 might choose from a multitude of paging approaches, such as a page and page-size approach in which data is requested by reference to a specific page number of a specific page size, or a skip and take approach in which a data request asks a content provider to skip X rows of data and requests the next Y rows. For example, in the page and page-size approach, a page size might be fifty rows, and a data request might ask for the second page of data. By contrast in the skip and take approach, a data request might ask a content provider to skip fifty rows of data and return the next fifty rows. Configuration information 108 can include paging information for each content provider 110 and middleware system 104 can use this paging information to translate the paging approach used by the uniform APIs to the paging approach used by that specific provider. In some cases, based on paging requirements and restrictions of particular content providers, users might need to send a plurality of uniform data requests to receive a requested amount of data, or middleware system 104 might return only a subset of the data returned by a content provider.

The following discussion now refers to methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
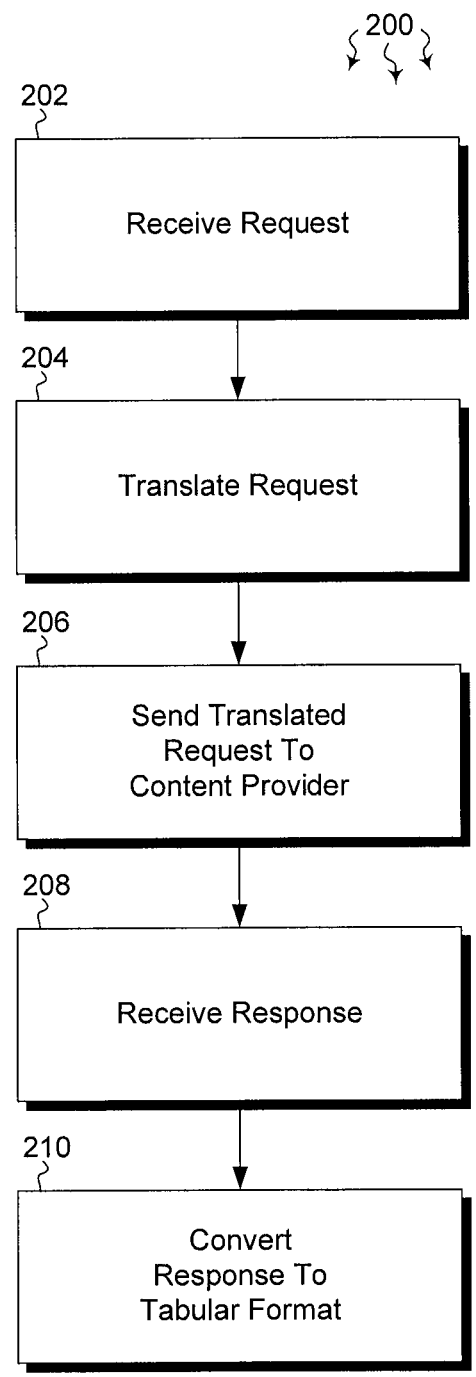
FIG. 2 illustrates a method for brokering requests and data between a user and a content provider.

Referring now to FIG. 2, a method 200 is illustrated for brokering requests and data between a user and a content provider. The method may be practiced, for example at a middleware system in communication with a user and a content provider. The method includes receiving a request for data from a user, the request formatted in a first request format and requesting data from a content provider (act 202). For example, middleware system 104 might receive uniform data request 112*a* from user 102*a* requesting data from content provider 110*a*. Uniform data request 112*a* might be formatted in accordance with a uniform API defined by middleware system 104, and might request that middleware system 104 forward the request to content provider 110*a*.

Method 200 further includes translating the request to a second request format that is compatible with the content provider (act 204). For example, middleware system 104 may consult configuration data 108 to determine how to translate uniform data request 112*a* to custom data request 114*a*, and/or use a runtime module or generated code to translate uniform data request 112*a* to custom data request 114*a*. For instance, middleware system 104 might use mapping and transformation component to translate uniform data request 112*a* to custom data request 114*a*. In some instances, a single uniform data request may be translated into multiple custom responses.

Furthermore, middleware system 104 might consult configuration data 108, including parameter definition and validation information, paging information, etc. prior to or after translating the request to a second request format. For example, middleware system 104 might use validation information to verify that any user-specified parameters from uniform data request 112*a* are valid, and notify user 102*a* if there is an error. Middleware system 104 might also use paging information to ensure that custom data request 114*a* includes proper paging parameters.

Method 200 includes sending the translated request to the content provider (act 206). For example, middleware system 104 might send custom data request 114*a* to content provider 110*a* for processing by content provider 110*a*.

Method 200 also includes receiving a response from the content provider that comprises hierarchically-structured content (act 208). For example, middleware system 104 may receive custom response 114*b* from content provider 110*a*. Custom response 114*b* might be received in response to middleware system 104 sending custom data request 114*a* to content provider 110*a*.

Method 200 also includes converting the hierarchically-structured content into tabular content (act 210). Converting hierarchically-structured content into tabular content may include middleware system 104 consulting mapping information from configuration data 108. Mapping information can define a series of queries for mapping hierarchically-structured data to tabular data. For instance, mapping data can define first queries that, when executed on hierarchically-structured content, return repeating nodes which are mapped to tabular rows. Moreover, mapping data can define second queries that, when executed on hierarchically-structured content, identify elements and/or attributes in the repeating nodes which are mapped to tabular columns. Queries can include both relative and absolute queries, as described above.

For example, in response to receiving custom response 114*b* from content provider 110*a*, middleware system 104 can use mapping and transformation component 106 to translate custom response 114*b* to a uniform data and messaging format based on configuration data 108. For instance mapping and transformation component 106 might perform first and second XPath queries on custom response 114*b* to convert custom response 114*b* into tabular form. In some instances middleware system 104 may use custom-defined namespaces when performing XPath queries.

Notably, subsequent to or prior to converting the hierarchically-structured content into tabular content, middleware system 104 may use error handling information to handle error conditions. For example, custom response 114*b* might include an error status code, such as an HTTP status code indicating an error. Alternatively, custom response 114*b* might include a success status code, such as an HTTP status code indicating success, but might include an indication of an error condition in a message body. In this situation, middleware system 104 might use error handling information to convert the indication of an error condition to an error status code and/or message. In either case, middleware system 104 can take remedial action, such as notifying a requesting user of the error.

After converting the hierarchically-structured content into tabular content, the method can also include storing and/or sending at least a portion of the tabular format. For example middleware system 104 can store tabular formatted data from custom message 114*b* in store 116. Additionally or alternatively, middleware system 104 can send all or part of the tabular formatted data to user 102*a* in uniform response 112*b*.

The foregoing embodiments may be practiced by a computer system including one or more processors and computer readable media such as computer memory. In particular, the computer memory may store computer executable instructions that when executed by one or more processors cause various functions to be performed, such as the acts recited in the embodiments.

Embodiments may also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Under some definitions, computer executable instructions may comprise computer software. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for brokering requests and data between a user and a content provider, the method comprising:
receiving, at a middleware system, a request for data from a user, the request formatted in a first request format and requesting data from a content provider;
translating the request to a second request format that is compatible with the content provider using configuration data, the configuration data comprising information used to transform data from the first request format to the second request format and information used to map custom messages in non-tabular formats from the content provider to uniform tabular format data or messaging formats;
sending the translated request to the content provider;
as a result of sending the translated request to the content provider, receiving a response from the content provider that comprises non-tabular, hierarchically-structured content;
converting the hierarchically-structured content into tabular content, wherein converting comprises executing a series of xPath queries defined in the configuration data, including:
performing one or more first xPath queries on the non-tabular hierarchically-structured content to identify repeating nodes previously defined in the configuration data in the hierarchically-structured content, and mapping the repeating nodes to rows in the tabular format; and
performing one or more second xPath queries on the hierarchically-structured content to identify values for one or more elements or attributes previously defined in the configuration data and mapping the values to columns in the tabular format; and
returning at least a portion of the tabular content to the user in response to the request for data from the user.

2. The method of claim 1, further comprising
storing at least a portion of the tabular content.

3. The method of claim 1, wherein translating the request comprises translating the request to a plurality of translated requests.

4. The method of claim 1, wherein the hierarchically-structured content comprises an indication of an error condition, the method further comprising:
performing one or more queries on the response to determine that the error condition is indicated in the hierarchically-structured content;

translating the error condition to an HTTP status code and an error message.

5. The method of claim 1, further comprising:
receiving a second request for data;
translating the second request to the second format;
sending the translated request to the content provider;
receiving a second response from the content provider; and
detecting that an HTTP status code of the response that indicates an error condition.

6. The method of claim 1, further comprising:
prior to sending the request to the content provider, performing a pattern match on the request to determine that the request includes valid parameters.

7. The method of claim 1, further comprising:
defining custom namespace elements for use in the one or more first queries and the one or more second queries.

8. The method of claim 1, further comprising:
defining help information that describes available parameters for the request and sample values for the parameters.

9. The method of claim 1, wherein the first request format comprises an OData request format.

10. The method of claim 1, wherein the one or more second queries comprise one or more relative queries to identify one or more elements or attributes that are relative to one of the repeating nodes.

11. The method of claim 1, wherein the one or more second queries comprise one or more absolute queries to identify one or more elements attributes with values shared by all of the repeating nodes.

12. A computer system for implementing a method for brokering requests and data between a user and a content provider, the computer system comprising:
one or more processors; and
one or more computer storage media having stored thereon computer executable instructions that, when executed by the one or more processors, implement the method comprising:
receiving, at a middleware system, a request for data from a user, the request formatted in a first request format and requesting data from a content provider;
translating the request to a second request format that is compatible with the content provider using configuration data, the configuration data comprising information used to transform data from the first request format to the second request format and information used to map custom messages in non-tabular formats from the content provider to uniform tabular format data or messaging formats;
sending the translated request to the content provider;
as a result of sending the translated request to the content provider, receiving a response from the content provider that comprises non-tabular, hierarchically-structured content;
converting the hierarchically-structured content into tabular content, wherein converting comprises executing a series of xPath queries defined in the configuration data, including:
performing one or more first xPath queries on the non-tabular hierarchically-structured content to identify repeating nodes previously defined in the configuration data in the hierarchically-structured content, and mapping the repeating nodes to rows in the tabular format; and
performing one or more second xPath queries on the hierarchically-structured content to identify values for one or more elements or attributes previously defined in the configuration data and mapping the values to columns in the tabular format; and
returning at least a portion of the tabular content to the user in response to the request for data from the user.

13. The computer system of claim 12, further comprising storing at least a portion of the tabular content.

14. The computer system of claim 12, wherein the one or more second queries comprise one or more relative queries for one or more attributes relative to one of the repeating nodes.

15. The computer system of claim 12, wherein the one or more second queries comprise one or more absolute queries for one or more attributes shared by each of the repeating nodes.

16. One or more physical computer storage devices having stored thereon computer executable instructions that, when executed by one or more processors of a computer system, implement a method for brokering requests and data between a user and a content provider, the method comprising:
receiving, at a middleware system, a request for data from a user, the request formatted in a first request format and requesting data from a content provider;
translating the request to a second request format that is compatible with the content provider using configuration data, the configuration data comprising information used to transform data from the first request format to the second request format and information used to map custom messages in non-tabular formats from the content provider to uniform tabular format data or messaging formats;
sending the translated request to the content provider;
as a result of sending the translated request to the content provider, receiving a response from the content provider that comprises non-tabular, hierarchically-structured content;
converting the hierarchically-structured content into tabular content, wherein converting comprises executing a series of xPath queries defined in the configuration data, including:
performing one or more first xPath queries on the non-tabular hierarchically-structured content to identify repeating nodes previously defined in the configuration data in the hierarchically-structured content, and mapping the repeating nodes to rows in the tabular format; and
performing one or more second xPath queries on the hierarchically-structured content to identify values for one or more elements or attributes previously defined in the configuration data and mapping the values to columns in the tabular format; and
returning at least a portion of the tabular content to the user in response to the request for data from the user.

17. The physical computer storage device of claim 16, further comprising storing at least a portion of the tabular content.

18. The physical computer storage device of claim 16, further comprising:
prior to sending the request to the content provider, performing a pattern match on the request to determine that the request includes valid parameters.

19. The physical computer storage device of claim 16, further comprising:
defining custom namespace elements for use in the one or more first queries and the one or more second queries.

* * * * *